Figure 1:
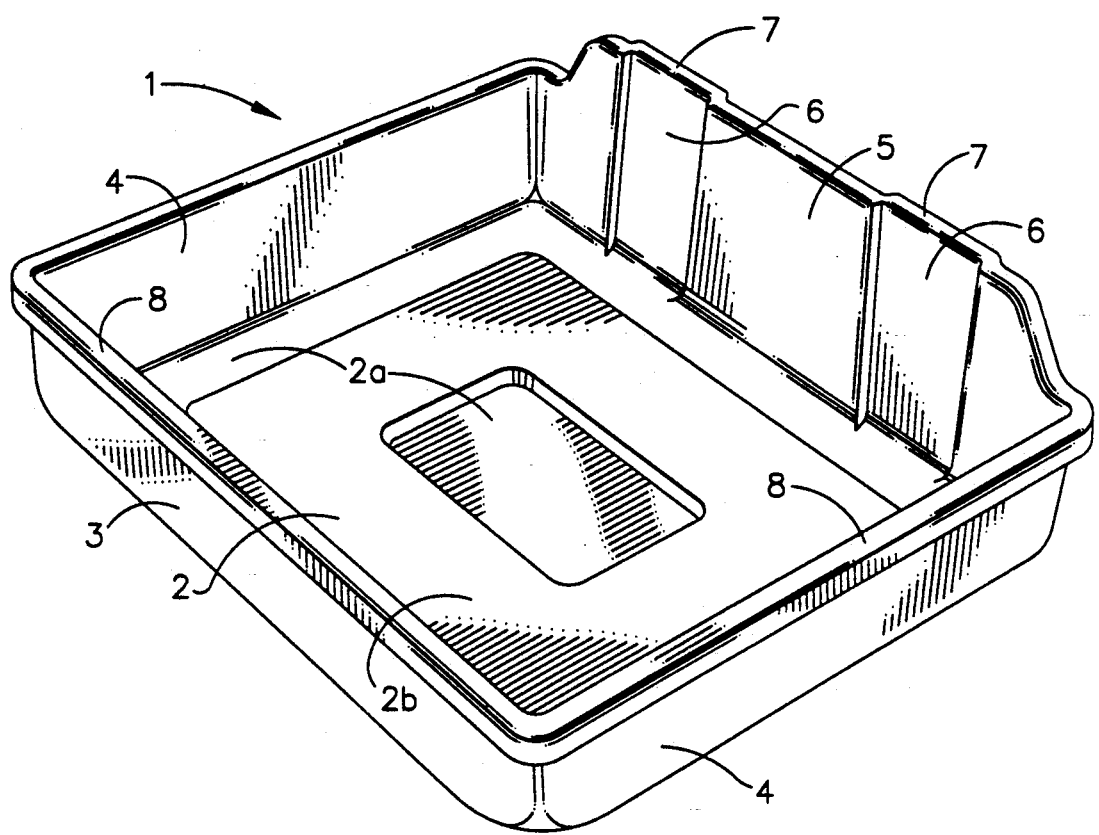

United States Patent [19]

Green

[11] Patent Number: 5,249,724
[45] Date of Patent: Oct. 5, 1993

[54] UNDERSEAT STORAGE CONTAINER

[76] Inventor: Howard T. Green, 5900 Fairham Rd., Hamilton, Ohio 45011

[21] Appl. No.: 830,735

[22] Filed: Feb. 4, 1992

[51] Int. Cl.$^5$ ............................................ B60R 7/00
[52] U.S. Cl. ................................... 224/275; 220/771
[58] Field of Search ............. 224/275, 42.463, 273, 224/279, 42.42, 42.32, 42.4, 42.33; 206/555, 557; 4/562, 563, 564; 297/188, 192, 193; 220/558, 570, 573, 671, 752, 771; D3/40, 73; 248/503, 503.1; 312/235.5, 235.2, 348.4; 296/37.8, 37.15, 37.16

[56] References Cited

U.S. PATENT DOCUMENTS

| | | | |
|---|---|---|---|
| D. 309,059 | 7/1990 | Bledsoe | D3/40 |
| 2,210,347 | 8/1940 | Story | 224/275 |
| 2,931,550 | 4/1960 | Wood | 224/275 |
| 3,026,141 | 3/1962 | Welles | 297/192 |
| 3,131,813 | 5/1964 | Jensen | 224/275 |
| 3,625,347 | 12/1971 | Trammell | 224/275 |
| 4,466,659 | 8/1984 | Carpentier et al. | 224/275 X |
| 4,540,213 | 9/1985 | Herlitz et al. | 296/37.5 |
| 4,718,584 | 1/1988 | Schoeny | 224/42.42 |
| 4,789,195 | 12/1988 | Fletcher | 224/42.42 X |
| 4,809,897 | 3/1989 | Wright | 224/42.42 |
| 4,848,627 | 7/1989 | Maeda et al. | 224/275 |
| 4,927,200 | 5/1990 | Wilkins | 296/37.8 |
| 4,981,232 | 1/1991 | Wynn | 206/562 X |
| 5,039,155 | 8/1991 | Suman et al. | 296/37.15 X |
| 5,065,920 | 11/1991 | Amner | 224/275 |
| 5,083,827 | 1/1992 | Hollenbaugh | 296/37.16 X |
| 5,096,249 | 3/1992 | Hines | 296/37.15 |

FOREIGN PATENT DOCUMENTS

| | | | |
|---|---|---|---|
| 565834 | 7/1960 | France | 220/573 |
| 2613299 | 10/1988 | France | 224/42.42 |

*Primary Examiner*—Henry J. Recla
*Assistant Examiner*—Glen T. Barrett

[57] ABSTRACT

A storage container for sundry articles specifically designed to fit from the rear under the rearmost bench seat of a minivan vehicle, having a rectangular bottom, four upstanding sides three of which fit under the seat when the container rests upon the floor of the vehicle without interfering with a seat adjustment mechanism. The fourth or back side is taller than the other three to restrain the container from sliding forward upon deceleration of the vehicle and to permit the container to be moved rearward when the seat is adjusted rearward.

3 Claims, 1 Drawing Sheet

UNDERSEAT STORAGE CONTAINER

This invention relates to a storage container for use under the seat of a land vehicle. More specifically, the invention relates to a storage container for use under the rear bench seat of a minivan sold by the Chrysler Corporation or of a similar vehicle.

BACKGROUND

1. Description of Prior Art

The minivan designs, especially those sold by the Chrysler Corporation since 1984, optimize passenger space and cargo space. Space in these vehicles for storage and transporting of sundry articles for safety, convenience and emergency automobile repair, however is minimum. The spare tire well, which in station wagons and sedans, provides out-of-sight space for such items as jumper cables, break down flares or reflectors, fire extinguisher, gloves, first aid kit and like objects, is not incorporated in the minivan design. Nor is the trunk space of a sedan available.

U.S. Pat. Nos. 4,718,584, 4,540,213 and others teach methods for organizing and utilizing the deck area in the hatchback style vehicle, station wagons and, by extension, minivans with one or both bench seats removed. These patents teach provisions for supporting packages such as grocery bags but do not provide permanent, out-of-sight storage which does not encroach upon passenger or cargo space.

Other means of augmenting the contained storage capacity for sundry articles in land vehicles do not address the efficient utilization of the waste space under the bench seats of Chrysler minivans and similar vehicles. Thus, U.S. Pat. No. 4,927,200 provides for a storage container detachably located in front of a seat under the legs of a passenger. Numerous patents provide storage and beverage holders on, between or accessible from the front seats. U.S. Pat. Nos. 4,809,897 and 4,848,627 are examples.

An application has been made to the Commissioner of Patents and Trademarks, dated Nov. 4, 1991 for a Design Patent for this invention entitled UNDER-SEAT SLIDABLE STORAGE CONTAINER FOR MOTOR VEHICLES.

OBJECTS AND ADVANTAGES

Accordingly, I claim the following as my objects and advantages of the invention: to provide a means for storing of sundry articles for which space or containment is not adequately provided in Chrysler minivans and similar vehicles, to utilize otherwise wasted space under the rearmost bench seat for this storage, to provide a container for sundry articles which is inhibited from sliding forward when the vehicle decelerates, to provide for automatic drawing back of the container when the adjustable seat is adjusted backward, to provide a means for grasping the container and removing it from under the seat, to provide this storage and these features without encroaching upon or compromising the operation of the adjusting mechanism of the adjustable bench seat or the esthetic appearance of the seat or of the fabric skirt attached to the back thereof.

The reader will find further objects and advantages of the invention from a consideration of the ensuing description and the accompanying drawing.

DRAWING FIGURE

FIG. 1 is a perspective view of the invention, with the following reference numbers:
1—general view
2—bottom
3—front wall
4—side walls
5—back
6—channel sections
7—grasping handles
8—turned edge

DESCRIPTION OF INVENTION

The underseat storage container is shown in FIG. 1. The bottom 2 as shown in FIG. 1, is broken from a continuous plane into two levels, 2a and 2b, for the sake of enhanced stiffness and to minimize distortion following manufacture. It will be apparent to those familiar with the art that other methods for achieving a strong, stiff and undistorted bottom can likewise be employed.

The front wall 3 and the side walls 4 of the container are angled outwardly from the vertical only as required for ease of manufacture; such as a 3% slope for removal from a plastic injection mold. The back is similarly angled.

The top turned edge 8 on all four walls of the container serves as a means to enhance overall strength and stiffness of the container structure and to minimize distortion of the walls. Frequently, injection molded parts are provided with spaced webbings or solid sections along the under side of such turned edges to improve these properties.

Those familiar with the design of such parts will recognize that alternative approaches for accomplishing the afore-mentioned structural results are available.

The back 5 is higher than the other three walls and is further stiffened with two channel-shaped portions 6. The turned edge 8 at the top of these channel-shaped sections is expanded laterally slightly to provide the finger space for convenient grasping handles 7. Other methods for improving stiffness and strength and for providing a means for grasping and drawing back the container will be apparent to those skilled in the art.

The outside corners and edges around the bottom are rounded to permit easy sliding on the vehicle floor which is normally carpet-covered.

FIG. 1 shows a design specifically for an injection molded container; the preferred material being medium density polyethylene or a similar material evidencing the requisite strength and toughness over the temperature range encountered by automobile interiors. However, other organic and inorganic materials including composites and other manufacturing processes may be employed.

OPERATION OF INVENTION

Some models of minivans are equipped with removable bench seats; such minivans as the Dodge Caravan and Plymouth Voyager offered by the Chrysler Corporation. One bench seat is either located directly behind the driver and front passenger seats or is removed from the vehicle. This bench seat is a two-passenger seat without provision for forward and rearward position adjustment.

The second bench seat, intended for three passengers, is adjustable forward and rearward and attaches to the floor either behind the two-passenger bench seat or in the same position as occupied by that two-passenger seat prior to its removal from the vehicle.

The present invention is a container which can be inserted under and from the rear of either bench seat provided said seat is the most rear seat in the vehicle.

The back wall 5 in FIG. 1 is of sufficient height and strength to prevent the sliding forward of the container upon deceleration of the vehicle. This is accomplished by the upper portion of the back 5 bearing against the back of the seat bottom and being thereby restrained.

This extension of the height of the back 5 in FIG. 1 likewise causes the container to be moved backward when the adjustable seat is moved rearward. In this manner it does not occupy passenger foot space following the seat adjustment. The back 5 is specifically extended in height so as to exceed the mid-height of the bolt heads of the seat belt anchor bolts which are attached to the back surface of the seat bottom. This feature precludes jamming of the container back 5 under the heads of said anchor bolts. Such a jamming situation might otherwise occur if the container was insufficiently loaded to resist a tendency for the front of the container to tilt upward when the seat: is adjusted rearward; said tilting action serving to lower the effective height of the back of the container relative to the anchor bolts.

The design of the back wall 5 provides, in addition, a means 7 of grasping the container to facilitate its removal from under the seat.

Some special design features of this container pertain to its use under the three-passenger, adjustable bench seat. This seat is equipped with latches under each side and an actuator handle by means of which these latches can be loosed and the seat moved forward or rearward to a different position. As a part of this seat adjustment mechanism, a wire traverses under the seat, which wire moves the latch under the left side of the seat in response to the actuator located under the right side of the seat. The front wall 3 and side walls 4 of the container are designed to pass under this wire with safe clearance during insertion of the container under the seat.

The width dimension of the container may not exceed the lateral clearance between the left latch and the actuator handle when the seat position is in the process of being adjusted. At the point of release for seat adjustment, the left latch is at its maximum travel toward the right of the vehicle while the actuator handle is at its farthest position toward the left of the vehicle. This minimum space between the latch and the actuator handle, allowing some finger space for grasping the actuator handle, establishes the maximum width of the container. Although this dimension constraint does not apply when the container is used under the two-passenger seat, said invention is equally useful with this two-passenger seat.

The three-passenger, adjustable bench seat is furnished with a fabric skirt which covers the back of the seat bottom thus hiding from view from the rear, the seat belt attachments affixed thereto The storage container of my invention provides grasping handles 7 in FIG. 1 with which the container may be removed from under the seat. The contour of the container with these grasping handles, however, does not interfere with the free-hanging of the seat skirt or the performance of its esthetic purpose. The bottom of the skirt is lifted to insert or withdraw the container.

Thus it can be seen that the container for storing sundry articles of this invention is specifically designed to fit from the rear under the rearmost bench seat of a minivan such as a Chrysler Corporation Dodge Caravan or Plymouth Voyager or similar vehicle. Its design provides approximately one cubic foot of accessible, contained storage without otherwise compromising the function or the esthetic appearance of the vehicle or its components.

While this description of my invention applies to the Chrysler minivans manufactured since 1984, it should be regarded only as the preferred embodiment of the invention and not limit the concept. Thus, other vehicles having usable and accessible space under the seat for which storage containers can be designed, may be so provided by applying the teachings of this invention.

It will likewise be apparent, to those skilled in the art, that a cover or lid can be provided, if desired, without affecting these teachings.

I claim:

1. An underseat storage container for use in a vehicle having a rear seat secured to a vehicle floor such that a space having a height is defined therebetween, said storage container comprising: a bottom having a periphery; a front wall; a rear wall having means for stiffening the rear wall; and a pair of sidewalls being integrally connected to said bottom such that said walls form a continuous wall extending about the periphery of the bottom, said bottom and said continuous wall form a storage space adapted for receiving sundry articles therein, each of said walls having a top edge turned in overlapping relation to said walls and forming a continuous turned top edge extending about said continuous wall, wherein the turned edge on said rear wall further defines a pair of grasping handles formed therein to aid the user in placing and removing the container from within the space, said front wall and said pair of sidewalls having a first height and said rear wall having a second height greater than said first height wherein said front wall and said pair of sidewalls are sized such that said container complimentally fits into said space and is adapted to slide upon the floor of said vehicle beneath said seat such that said container is adapted to be located within said space, said second height of said rear wall being greater than the height of said space such that said rear wall is adapted to contact said seat and limit the sliding of the container into said space.

2. The underseat storage container according to claim 1, wherein said means for stiffening includes a pair of vertically extending channels formed within said rear wall.

3. The underseat storage container according to claim 2, wherein said channels extend from the bottom to the pair of grasping handles.

* * * * *